April 7, 1970     V. SHANOK ET AL     3,504,473

COMPOSITE NAILABLE MOLDING STRIP

Filed March 15, 1968

INVENTORS
VICTOR SHANOK
JESSE P. SHANOK
BY
ATTORNEYS

United States Patent Office 3,504,473
Patented Apr. 7, 1970

3,504,473
COMPOSITE NAILABLE MOLDING STRIP
Victor Shanok and Jesse P. Shanok, Brooklyn, N.Y., assignors to Glass Laboratories Company, a New York limited partnership
Filed Mar. 15, 1968, Ser. No. 713,403
Int. Cl. E04f *19/02*
U.S. Cl. 52—717   7 Claims

ABSTRACT OF THE DISCLOSURE

A composite arcuate molding strip containing an embedded decorative metallic foil. A plurality of tubular attaching devices are disposed along axis of the strip. One end is connected to the strip projecting from the concave face thereof: The attaching device permits fasteners to extend completely through the molding strip without damage.

BACKGROUND OF THE INVENTION

Field of the invention

This invention relates generally to trim strips or molding strips, and particularly to means for fastening such strips to a workpiece, or the like.

Description of the prior art

In the art of forming such decorative trim strips, it has been found desirable to provide a thin ribbon or tape of metal foil encased within a smooth-surfaced, transparent thermoplastic material which may be disposed in a variety of arcuate positions, said thermoplastic material assuming a set so that it will remain in the arcuate position. As is known, with such an assembly, the transparent thermoplastic material will expose the metal foil to view, thereby providing the strip with the appearance of a highly polished metal finish.

It has been a problem, however, to the prior art, that these elongated, arcuate-shaped molding strips are difficult to attach to the desired workpiece, be it wood paneling or luggage, and the like, so that they present not only a strong attachment but also a decorative molding strip that is aesthetically pleasing to the eye. Various attempts have been made to provide prongs, nails and other fastening devices joined to the molding member itself, but these have generally proved unsuitable. Moreover, it has even been attempted to drive a nail right through the arcuate-shaped molding member, but this proved rather unsightly as well as tending to shatter the molding strip at the point of entry of the nail.

SUMMARY OF THE INVENTION

It is therefore among one of the principal objects of the invention to provide a means for securing an elongated, arcuate-shaped molding strip to a workpiece which will result in both a strong and aesthetically pleasing attachment to the desired workpiece.

In accordance with the present invention, there has now been provided a composite molding strip adaptable for disposition on a support therefor which strip comprises an elongated, arcuate-shaped molding member provided with receiving means for securing said member to a suitable workpiece therefor, said receiving means further comprising an attaching device joined to said molding member and adapted to receive a nail, or the like, therethrough.

BRIEF DESCRIPTION OF THE DRAWING

The invention will be hereinafter more fully described with reference to the accompanying drawing in which.

DESCRIPTION OF THE PREFERRED EMBODIMENTS

Figure 1:
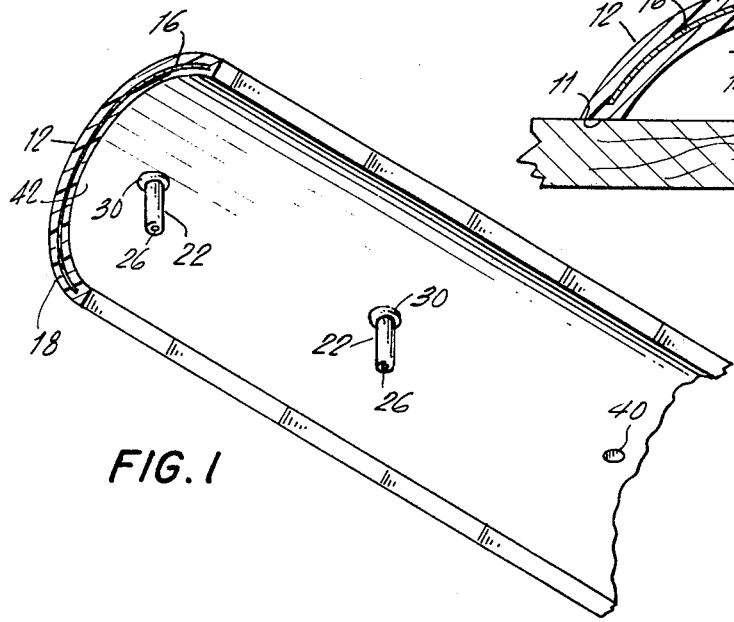
FIG. 1 is a perspective view of the invention molding strip.

Referring now to the figures of the drawing, wherein like parts are identified by like reference numerals, there is shown (FIG. 1) a decorative strip or molding 10 comprising an elongated, arcuate-shaped molding member 12 which is provided with an attaching device 14 pursuant to the present invention. The molding 10 further comprises an inner metallic foil 16 encased in a sheet 18 of suitable plastic material which may be an ABS vinyl or cellulose acetate butyrate resin.

Figure 5:
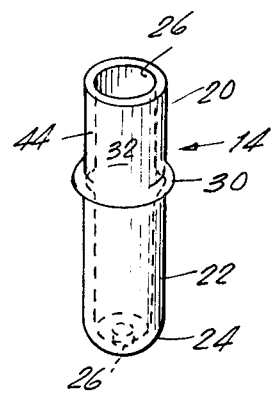
FIG. 5 is a view in perspective of the attaching device of the invention.

The attaching device 14, or receiving means for a nail or the like, as will be shown, comprises (FIG. 5) as an integral unit, an eyelet 20 having a generally cylindrically shaped body 22, tapered at its lower end 24 thereof, a generally centrally located bore 26 running vertically therethrough, and having a circular flange or shoulder 30 extending outwardly away from outer wall 32 of body 22, located preferably about ⅔ of the way up outer wall 32, and away from lower end 24. Eyelet 20 may be either of hollow or solid construction, preferably the former, and is made of a suitable light metal.

Figure 2:
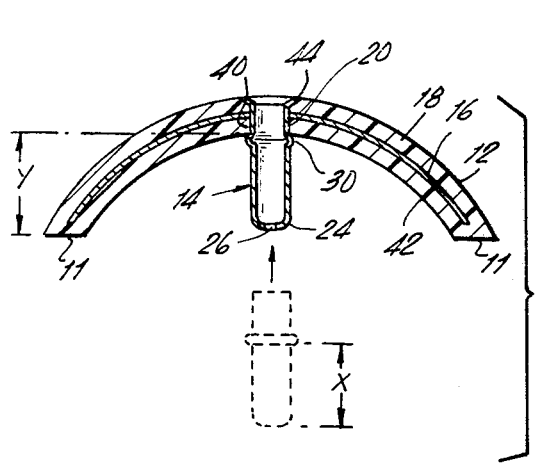
FIG. 2 is an end cross-sectional view of the molding strip with the attaching device shown inserted and detached from the molding member.
Figure 3:
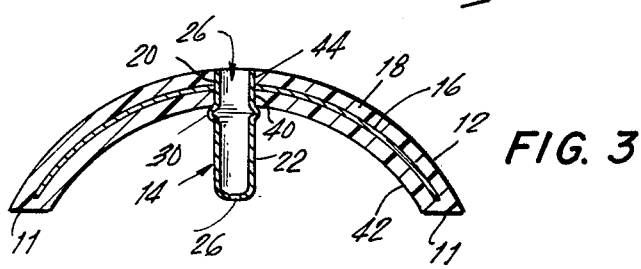
FIG. 3 is a view similar to FIG. 2 showing another embodiment of the invention.

In order to install the eyelet 20 into molding member 12, what is done is to drill and countersink a series of bores 40 in a central horizontal line along the elongated axis of member 12, in the direction of the inner face 42 of member 12, and thence eyelet 20 is inserted up into bore 40 by its upper end 44 until flange 30 comes to rest against inner face 42 of member 12. Finally, upper end 44 is secured against bore 40 by a conventional "spin-out" technique well known to the art (FIG. 2). It is to be understood that the height of end 44 of eyelet 20 will vary depending on the thickness of the molding strip, so that it will never protrude above the outer surface of the strip. Alternatively, the bore 40 need not be counter-sunk, and eyelet 20 may be force-fitted into bore 40 by means of its upper end 44 so that a tight fit is achieved of eyelet to molding member (FIG. 3). The distance X between flange 30 and lower tapered end 24 of eyelet 20 may vary as desired, however, the distance X must always be less than the distance Y, i.e. the maximum perpendicular height of the inside of the arc, as will become apparent.

Figure 4:
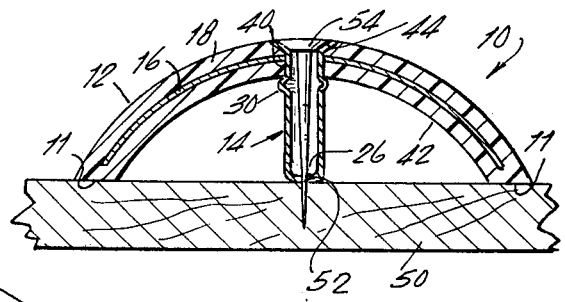
FIG. 4 is a view similar to FIG. 2 and showing a nail hammered into a wood workpiece through the attaching device to secure the molding member to the workpiece.

To secure molding 10 to a desired workpiece, such as but not limited to a wood panel 50 (FIG. 4), what is done is to place the molding 10 against the said panel, with its arcuate extreme ends 11 thereof in smooth abutment with said panel, and thereafter a nail 52 is driven into eyelet 20 through bore 26 thereof and into wood panel 50. In this embodiment, as shown, the head 54 of the nail 52 is shaped to be associatingly accommodated in the counter-bore 40. The head 54 may also serve as a decorative element and may be provided with such features as varied colors, brightness, etc. Thus by the invention molding, there is achieved an extremely strong securement of molding to workpiece and an aesthetically pleasing effect, as well.

It can now be seen why distance X must be less than distance Y, and that is to allow for the smooth abutment of the extreme arcuate ends 11 of body member 12 with the workpiece 50.

Having thus described the fundamental novel features of the invention as applied to a specific embodiment, it is to be understood that various changes may be made in the form of the device illustrated by those skilled in the art without departing from the spirit and scope thereof.

What is claimed is:

1. A composite molding strip adaptable for disposition on a support therefor which comprises an elongated arcuate-shaped molding member provided with receiving means for securing said molding member to a workpiece therefor, said receiving means further comprising a plurality of tubular members joined to said molding member, said tubular members being disposed along a central horizontal line definable along the elongated axis of said molding member and in spaced relation to each other, said tubular members being adapted to receive securing means therethrough.

2. A composite molding strip adaptable for disposition on a support therefor which comprises an elongated, arcuate-shaped molding member provided with receiving means for securing said molding member to a workpiece therefor, said receiving means further comprising an attaching device joined to said molding member and adapted to receive securing means therethrough, and wherein said attaching device further comprises an eyelet having a generally cylindrically shaped body tapered at one end thereof, a generally centrally located bore coursing vertically therethrough, and having a circular flange extending outwardly away from said body and upwardly away from said tapered end of said body, said securing means further comprising a nail driven through said bore into said workpiece.

3. A strip according to claim 2 wherein said eyelet is inserted in a bore provided for that purpose in said molding member.

4. A strip according to claim 3 wherein a plurality of eyelets and bores therefor are provided.

5. A strip according to claim 4 wherein said bores in said molding member are located in a central horizontal line along the elongated axis of said elongated, arcuate-shaped molding member.

6. In combination, a workpiece and an elongated, arcuate-shaped molding member provided with receiving means for securing said molding member to said workpiece, said receiving means further comprising an attaching device joined to said molding member and adapted to receive securing means therethrough, said attaching device further comprising an eyelet having a generally cylindrically shaped body tapered at one end thereof, a generally centrally located bore coursing vertically therethrough, and having a circular flange extending outwardly away from said body and upwardly away from the tapered end of said body, said securing means further comprising a nail driven through said bore into said workpiece.

7. A strip according to claim 3 wherein said flange abuts against the inner face of said molding member.

References Cited

UNITED STATES PATENTS

| | | | |
|---|---|---|---|
| 744,537 | 11/1903 | Hale | 52—716 X |
| 2,186,684 | 1/1940 | Ritter | 52—287 |
| 2,585,285 | 2/1952 | Tonge et al. | 85—70 X |
| 3,016,590 | 1/1962 | Shanok et al. | 52—718 X |
| 3,215,026 | 11/1965 | Davis | 85—70 |
| 3,376,683 | 4/1968 | Epstein | 52—521 X |

ALFRED C. PERHAM, Primary Examiner

U.S. Cl. X.R.

52—467